US012725404B2

(12) United States Patent
Liu et al.

(10) Patent No.: US 12,725,404 B2
(45) Date of Patent: Sep. 1, 2026

(54) METHOD AND SYSTEM FOR DETECTING RAILWAY FOREIGN OBJECT INTRUSION, DEVICE AND MEDIUM

(71) Applicant: CHINA RAILWAY DESIGN CORPORATION, Tianjin (CN)

(72) Inventors: Guiwei Liu, Tianjin (CN); Fei Wang, Tianjin (CN); Qingguo Cui, Tianjin (CN); Zelian Chen, Tianjin (CN); Yang Tian, Tianjin (CN); Xuesong Fu, Tianjin (CN); Chen Zhang, Tianjin (CN); Qihao Sun, Tianjin (CN); Xuanyu Zhang, Tianjin (CN); Guangxue Ren, Tianjin (CN); Yajun Lang, Tianjin (CN)

(73) Assignee: CHINA RAILWAY DESIGN CORPORATION, Tianjin (CN)

( * ) Notice: Subject to any disclaimer, the term of this patent is extended or adjusted under 35 U.S.C. 154(b) by 193 days.

(21) Appl. No.: 18/892,616

(22) Filed: Sep. 23, 2024

(65) Prior Publication Data

US 2025/0218159 A1 Jul. 3, 2025

Related U.S. Application Data

(63) Continuation of application No. PCT/CN2024/075662, filed on Feb. 4, 2024.

(30) Foreign Application Priority Data

Jan. 2, 2024 (CN) ........................ 202410003165.8

(51) Int. Cl.

| | |
|---|---|
| ***G06V 10/771*** | (2022.01) |
| ***G06T 5/20*** | (2006.01) |
| ***G06T 7/11*** | (2017.01) |
| ***G06T 7/70*** | (2017.01) |
| ***G06V 10/80*** | (2022.01) |

(52) U.S. Cl.

CPC .............. *G06V 10/771* (2022.01); *G06T 5/20* (2013.01); *G06T 7/11* (2017.01); *G06T 7/70* (2017.01);

(Continued)

(58) Field of Classification Search

CPC .... G06T 5/20; G06T 7/11; G06T 7/70; G06V 10/771; G06V 10/806; G06V 10/82;

(Continued)

(56) References Cited

U.S. PATENT DOCUMENTS

2024/0118702 A1* 4/2024 Cella ................ G05B 19/41885

FOREIGN PATENT DOCUMENTS

CN 111626203 B * 11/2021 ............. G06F 18/24
CN 116597394 A * 8/2023 ....... G08B 13/19602

(Continued)

OTHER PUBLICATIONS

Chen et al, Foreign Object Detection in Railway ImagesBasedonanEfficient Two-Stage Convolutional Neural Network, Research Article (2024).*

(Continued)

*Primary Examiner* — Vu Le
(74) *Attorney, Agent, or Firm* — Mark T. Vogelbacker; Eckert Seamans Cherin & Mellott, LLC

(57) ABSTRACT

A method and a system for detecting railway foreign object intrusion, and a device and a medium can include acquiring a first key frame of railway image of a current scenario as a template image, and an $N^{th}$ frame of railway image as a to-be-detected image; inputting the template image and the to-be-detected image of the current scenario into a foreign object intrusion prediction model to obtain a foreign object feature map of the current scenario, so as to determine whether there is a different target between the to-be-detected image and the template image of the current scenario; and (Continued)

filtering, by using a moving object filter model, a moving object from the different target of the to-be-detected image of the current scenario in response to existing different target, to obtain a true foreign object in the to-be-detected image of the current scenario.

20 Claims, 3 Drawing Sheets

(52) U.S. Cl.
CPC ........ *G06V 10/806* (2022.01); *G06V 2201/07* (2022.01)

(58) Field of Classification Search
CPC .... G06V 2201/07; G06V 20/00; G06V 10/00; G06V 40/00; G06V 2201/00; G06V 30/00
See application file for complete search history.

(56) References Cited

FOREIGN PATENT DOCUMENTS

| | | | | |
|---|---|---|---|---|
| CN | 116485799 B | * | 9/2023 | G06T 7/0004 |
| CN | 112508892 B | * | 10/2024 | G06T 5/70 |
| CN | 118865209 A | * | 10/2024 | G06N 3/084 |

OTHER PUBLICATIONS

Shanping et al, Research on Foreign Object Intrusion Detection for Railway Tracks Utilizing Risk Assessment and YOLO Detection, IEEE (2024).*

Wang et al, A Review of Intrusion Detection for Railway Perimeter Using Deep Learning-Based Methods, IEEE (2024).*

* cited by examiner

METHOD AND SYSTEM FOR DETECTING RAILWAY FOREIGN OBJECT INTRUSION, DEVICE AND MEDIUM

CROSS-REFERENCE TO RELATED APPLICATION

This patent application is a 35 U.S.C. 111(a) continuation of International Application No. PCT/CN2024/075662, filed on Feb. 4, 2024, which claims the benefit and priority of Chinese Patent Application No. 2024100031658 filed with the China National Intellectual Property Administration on Jan. 2, 2024 and entitled "A METHOD AND SYSTEM FOR DETECTING RAILWAY FOREIGN OBJECT INTRUSION, A DEVICE AND A MEDIUM". Both of the aforementioned applications are hereby incorporated by reference in their entireties.

TECHNICAL FIELD

The present disclosure relates to the field of railway foreign object detection, and in particular to a method and system for detecting railway foreign object intrusion, and a device and a medium.

BACKGROUND

Foreign object intrusion is the most serious threat to an external environment faced by railway operation. Traditional foreign object detection is completed manually. Due to suddenness, unpredictability, and irregularity of foreign object intrusion events, serious consequences are easily caused if timely warning cannot be given when facing sudden foreign object intrusion (such as falling rocks or landslides).

Image recognition is one of the main research directions in the field of artificial intelligence. Traditional image detection methods often use different methods, that is, differences between the captured image and the template image are compared in real time. However, this method has a single technical means, is easily affected by light and camera angles, has poor reliability, and is difficult to adapt to complex outdoor scenarios.

SUMMARY

On this basis, the embodiment of the present disclosure provides a method and system for detecting railway foreign object intrusion, and a device and a medium to improve the reliability of railway foreign object intrusion detection.

To achieve the above objective, the embodiments of the present disclosure provide the following solutions:

A method for detecting railway foreign object intrusion includes:

acquiring a template image, a to-be-detected image, and a to-be-detected image set of a current scenario, where the template image is a first key railway image frame, the to-be-detected image is an $N^{th}$ railway image frame, and the to-be-detected image set includes: an $(N+1)^{th}$ railway image frame to an $(N+m)^{th}$ railway image frame, where N>1, and m>1:

inputting the template image of the current scenario and the to-be-detected image of the current scenario into a foreign object intrusion prediction model to obtain a foreign object feature map of the current scenario, where the foreign object feature map is used for determining whether there is a different target between the to-be-detected image and the template image, and the foreign object intrusion prediction model is constructed on based on a siamese network and a UNet segmentation network; and determining a location of the different target to obtain a target location in response to a determination that there is a different target between the to-be-detected image of the current scenario and the template image of the current scenario: determining, by using a moving object filter model, whether there is a different target between a target location of each image frame in the to-be-detected image set of the current scenario and the template image of the current scenario; determining that there is a foreign object in the different target of the to-be-detected image of the current scenario in response to a determination that a number of image frames with different targets in the $N^{th}$ railway image frame to the $(N+m)^{th}$ railway image frame of the current scenario is greater than a predetermined value: setting an area where the location of the different target in the $N^{th}$ railway image frame to the $(N+m)^{th}$ railway image frame of the current scenario changes as a moving object; and filtering the moving object from the different target of the to-be-detected image of the current scenario to obtain a true foreign object in the to-be-detected image of the current scenario.

In some embodiments, the determining, by using a moving object filter model, whether there is a different target between a target location of each image frame in the to-be-detected image set of the current scenario and the template image of the current scenario includes:

determining whether there is the different target between the target location of each image frame in the to-be-detected image set of the current scenario and the template image of the current scenario by using an Intersection over Union (IOU) matching method in the moving object filter model.

In some embodiments, a method for determining the foreign object intrusion prediction model includes:

- acquiring training data, where the training data includes: template images and to-be-detected images of different training scenarios, and corresponding label data, and the label data includes whether there is a different target between a template image and a to-be-detected image of a training scenario;
- constructing a fusion network model that fuses the siamese network and the UNet segmentation network, where the fusion network model includes: a first encoder, a second encoder, a feature fusion module, and a decoder, the first encoder and the second encoder are of the same structure and are both connected to the feature fusion module, and the feature fusion module is connected to the decoder; and
- training the fusion network model with the template images of different training scenarios in the training data as an input of the first encoder, and the to-be-detected images of different training scenarios in the training data as an input of the second encoder, and with a goal of minimizing a loss function, and setting the trained fusion network model as the foreign object intrusion prediction model.

In some embodiments, the first encoder includes a first image partitioning layer, a first convolutional layer, a second convolutional layer, a third convolutional layer, a fourth convolutional layer, and a fifth convolutional layer connected in sequence.

The first image partitioning layer is configured to traverse input template images by a moving window method to obtain a plurality of small template images: the first convolutional layer is configured to perform a convolution operation on each of the small template images to obtain a first feature map of each of the small template images: the second convolutional layer is configured to perform convolution and downsampling pooling operations on the first feature map to obtain a second feature map: the third convolutional layer is configured to perform convolution and downsampling pooling operations on the second feature map to obtain a third feature map: the fourth convolutional layer is configured to perform convolution and downsampling pooling operations on the third feature map to obtain a fourth feature map: the fifth convolutional layer is configured to perform convolution and downsampling pooling operations on the fourth feature map to obtain a fifth feature map.

The second encoder includes a second image partitioning layer, a sixth convolutional layer, a seventh convolutional layer, an eighth convolutional layer, a ninth convolutional layer, and a tenth convolutional layer.

The second image partitioning layer is configured to traverse input to-be-detected images by the moving window method to obtain a plurality of small to-be-detected images: the sixth convolutional layer is configured to perform a convolution operation on each of the small to-be-detected images to obtain a sixth feature map of each of the small to-be-detected images; the seventh convolutional layer is configured to perform convolution and downsampling pooling operations on the sixth feature map to obtain a seventh feature map: the eighth convolutional layer is configured to perform convolution and downsampling pooling operations on the seventh feature map to obtain an eighth feature map: the ninth convolutional layer is configured to perform convolution and downsampling pooling operations on the eighth feature map to obtain a ninth feature map: the tenth convolutional layer is configured to perform convolution and downsampling pooling operations on the ninth feature map to obtain a tenth feature map.

The feature fusion module includes: a concatenation layer and a spatial pyramid pooling layer connected in sequence: the concatenation layer is configured to concatenate the fifth feature map and the tenth feature map to obtain a concatenation feature: the spatial pyramid pooling layer is configured to perform a spatial pyramid pooling operation on the concatenation feature to obtain a fusion feature.

The decoder includes a first upsampling layer, a second upsampling layer, a third upsampling layer, a fourth upsampling layer, and a fifth upsampling layer connected in sequence: the first upsampling layer is connected to the spatial pyramid pooling layer; an input of the second upsampling layer is connected to outputs of the fourth convolutional layer and the ninth convolutional layer: an input of the third upsampling layer is connected to outputs of the third convolutional layer and the eighth convolutional layer: an input of the fourth upsampling layer is connected to outputs of the second convolutional layer and the seventh convolutional layer: an input of the fifth upsampling layer is connected to outputs of the first convolutional layer and the sixth convolutional layer.

The first upsampling layer is configured to perform an upsampling operation on the fusion feature to obtain a first decoding feature: the second upsampling layer is configured to concatenate the first decoding feature, the fourth feature map, and the ninth feature map to obtain a second decoding feature: the third upsampling layer is configured to concatenate the second decoding feature, the third feature map, and the eighth feature map to obtain a third decoding feature: the fourth upsampling layer is configured to concatenate the third decoding feature, the second feature map, and the seventh feature map to obtain a fourth decoding feature; and the fifth upsampling layer is configured to concatenate the fourth decoding feature, the first feature map, and the sixth feature map to obtain a foreign object feature map.

In some embodiments, the inputting the template image of the current scenario and the to-be-detected image of the current scenario into a foreign object intrusion prediction model to obtain a foreign object feature map of the current scenario includes:

performing image enhancement processing on each of the template image of the current scenario and the to-be-detected image of the current scenario to obtain an enhanced template image of the current scenario and an enhanced to-be-detected image of the current scenario; and inputting the enhanced template image of the current scenario and the enhanced to-be-detected image of the current scenario into the foreign object intrusion prediction model to obtain the foreign object feature map of the current scenario.

In some embodiments, the performing image enhancement processing on each of the template image of the current scenario and the to-be-detected image of the current scenario to obtain an enhanced template image of the current scenario and an enhanced to-be-detected image of the current scenario includes:

performing image correction and image noise processing on the template image of the current scenario in sequence to obtain the enhanced template image of the current scenario; and performing the image correction and image noise processing on the to-be-detected image of the current scenario in sequence to obtain the enhanced to-be-detected image of the current scenario.

In some embodiments, m=5, and the predetermined value is 4.

The present disclosure further provides a system for detecting railway foreign object intrusion, including:

an image acquisition module, configured to acquire a template image, a to-be-detected image, and a to-be-detected image set of a current scenario, where the template image is a first key railway image frame, the to-be-detected image is an $N^{th}$ railway image frame, and the to-be-detected image set includes an $(N+1)^{th}$ railway image frame to an $(N+m)^{th}$ railway image frame, where N>1, and m>1;

a foreign object intrusion prediction module, configured to input the template image of the current scenario and the to-be-detected image of the current scenario into a foreign object intrusion prediction model to obtain a foreign object feature map of the current scenario, where the foreign object feature map is used for determining whether there is a different target between the to-be-detected image and the template image, and the foreign object intrusion prediction model is constructed based on a siamese network and a UNet segmentation network; and a filter module, configured to determine a location of the different target to obtain a target location in response to a determination that there is a different target between the to-be-detected image of the current scenario and the template image of the current scenario; determine, by using a moving object filter model, whether there is a different target between a target location of each image frame in the to-be-detected image set of the current scenario and the template image of the current scenario; determine that there is a foreign object in the different target of the to-be-detected image of the current scenario in response to a determination that a number of image frames with different targets in the $N^{th}$ railway image frame to the $(N+m)^{th}$ railway image frame of the current scenario is greater than a predetermined value: set an area where the location of the different target in the $N^{th}$ railway image frame to the $(N+m)^{th}$ railway image frame of the current scenario changes as a moving object; and filter the moving object from the different target of the to-be-detected image of the current scenario to obtain a true foreign object in the to-be-detected image of the current scenario.

The present disclosure further provides an electronic device, including a memory and a processor. The memory is configured to store a computer program; and the processor runs the computer program to enable the electronic device to perform the above method for detecting railway foreign object intrusion.

The present disclosure further provides a non-transitory computer-readable storage medium, storing a computer program. The computer program is executed by a processor to implement the above method for detecting railway foreign object intrusion.

According to specific embodiments provided by the present disclosure, the present disclosure discloses the following technical effects:

In embodiments of the present disclosure, a foreign object intrusion prediction model is constructed based on the siamese network and a UNet segmentation network to realize recognition of a foreign object feature map, thereby determining whether there is a different target between a to-be-detected image and a template image of a target scenario; and then a moving object is filtered from the different target of the to-be-detected image of the target scenario by using a moving object filter model to obtain a true foreign object in the to-be-detected image of a target scenario, which can quickly and accurately recognize a newly added foreign object, thereby improving the reliability of foreign object intrusion detection, and thus providing a more specific, scientific, and efficient monitoring means for railway construction, operation and maintenance, disaster prevention and reduction, and the like, and improving the safety level of railway operation, and which has great actual application value.

BRIEF DESCRIPTION OF THE DRAWINGS

To describe technical solutions in embodiments of the present disclosure or in conventional art more clearly, the following briefly describes the drawings required for describing the embodiments. The drawings in the following description show merely some embodiments of the present disclosure, and those of ordinary skill in the art may still obtain other drawings from these drawings without creative efforts.

DETAILED DESCRIPTION OF THE EMBODIMENTS

Technical solutions in embodiments of the present disclosure will be clearly and completely described below with reference to accompanying drawings in the embodiments of the present disclosure. Apparently, the described embodiments are merely part rather than all of the embodiments of the present disclosure. Based on the embodiments of the present disclosure, all other embodiments obtained by those of ordinary skill in the art without creative work fall within the scope of protection of the present disclosure.

In recent years, deep learning technology has made significant development in the field of artificial intelligence. In inspections of railway foreign object intrusion, image recognition can provide support for railway operation by performing model training according to image data collected on site and extracting key information from the image data to recognize a foreign object.

Objectives of the present disclosure are to provide a method and a system for detecting railway foreign object intrusion, and a device and a medium, which realizes railway foreign object intrusion detection based on the siamese network and a UNet segmentation network and improves the reliability of railway foreign object intrusion detection.

To make the above objectives, features, and advantages of the present disclosure more apparent and more comprehensible, the present disclosure is further described in detail below with reference to the drawings and specific implementations.

Embodiment 1

Figure 1:
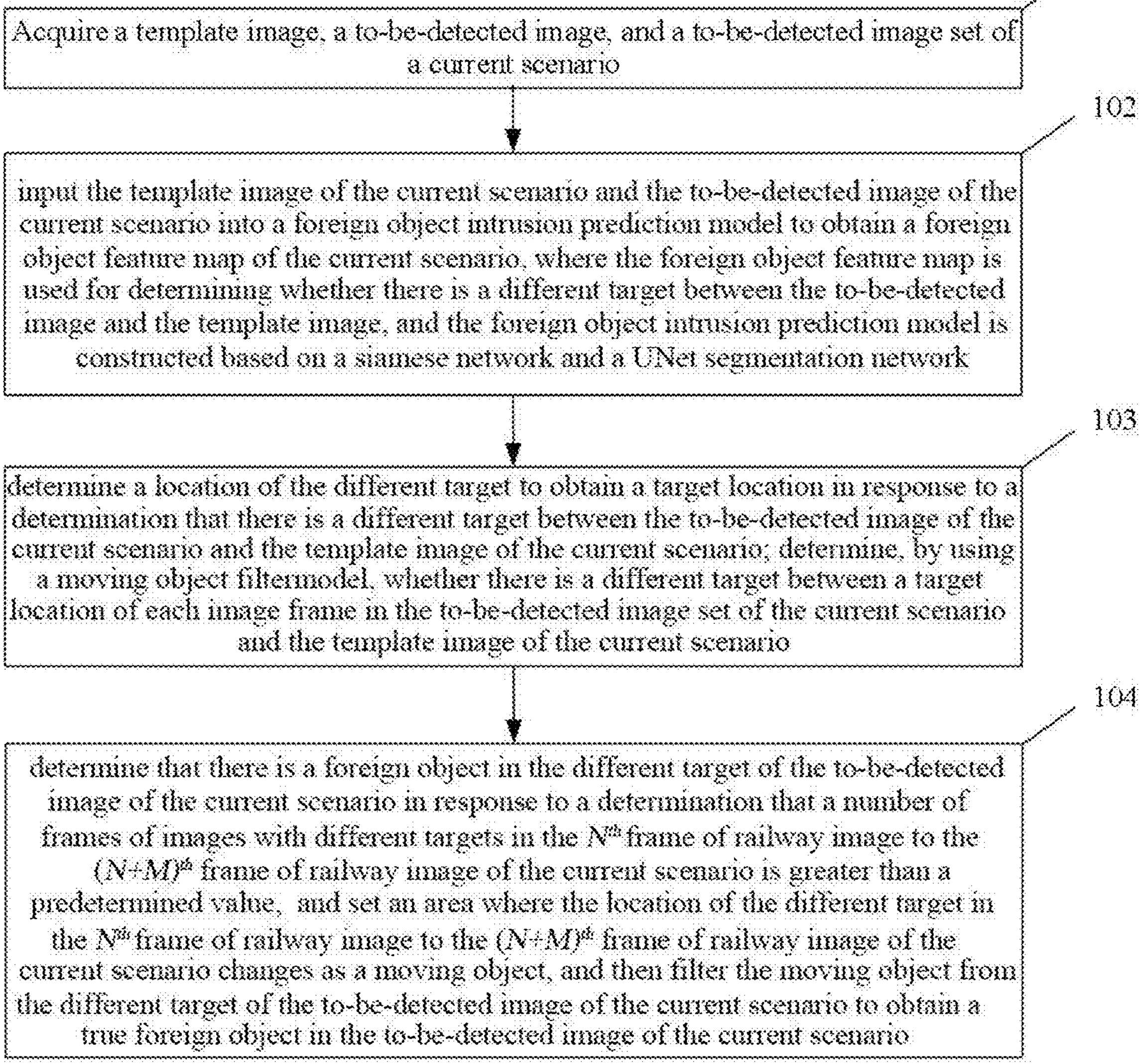
FIG. 1 is a flowchart of a method for detecting railway foreign object intrusion according to the embodiments of the present disclosure.

Referring to FIG. 1, a method for detecting railway foreign object intrusion in the present embodiment includes the following steps.

In Step 101: a template image, a to-be-detected image, and a to-be-detected image set of a current scenario are acquired.

The first key frame of railway images is selected as the template image, the to-be-detected image is an $N^{th}$ frame of railway image, and the to-be-detected image set includes an $(N+1)^{th}$ frame of railway image to an $(N+m)^{th}$ frame of railway image, where $N>1$, and $m>1$. Setting $m=5$ for an example.

In Step 102: The template image of the current scenario and the to-be-detected image of the current scenario are input into a foreign object intrusion prediction model to obtain a foreign object feature map of the current scenario. The foreign object feature map is used for determining whether there is a different target between the to-be-detected image and the template image. The foreign object intrusion prediction model is constructed based on a siamese network and a UNet segmentation network.

Step 102 specifically includes:

(1) Image enhancement processing is performed on each of the template image of the current scenario and the to-be-detected image of the current scenario, to obtain an enhanced template image of the current scenario and an enhanced to-be-detected image of the current scenario.

Specifically, image correction and image noise processing are performed on the template image of the current scenario in sequence to obtain the enhanced template image of the current scenario; and the image correction and image noise processing are performed on the to-be-detected image of the current scenario in sequence to obtain the enhanced to-be-detected image of the current scenario.

(2) The enhanced template image of the current scenario and the enhanced to-be-detected image of the current scenario are input into the foreign object intrusion prediction model to obtain the foreign object feature map of the current scenario.

A method for determining the foreign object intrusion prediction model specifically includes:

1. Training data is acquired. The training data includes: template images and to-be-detected images of different training scenarios, and corresponding label data, and the label data includes whether there is the different target between a template image and a to-be-detected image of a training scenario.

2. A fusion network model that fuses the siamese network and the UNet segmentation network is constructed. The fusion network model includes a first encoder, a second encoder, a feature fusion module, and a decoder. The first encoder and the second encoder are of the same structure and are both connected to the feature fusion module. The feature fusion module is connected to the decoder.

A structure of the fusion network model is specifically introduced below in combination with FIG. 2.

Figure 2:
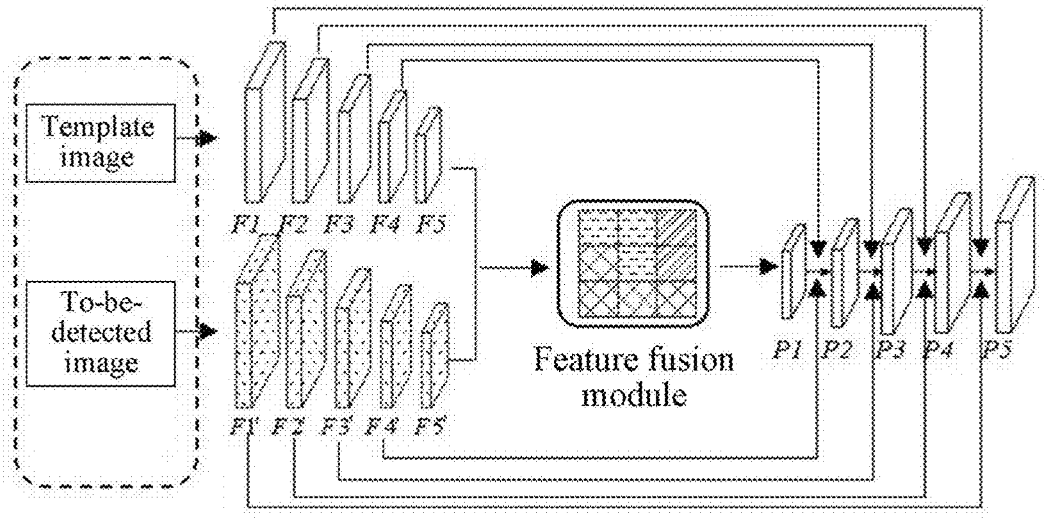
FIG. 2 is a structural diagram of a fusion network model according to the embodiments of the present disclosure.

Referring to FIG. 2, the first encoder includes a first image partitioning layer (not shown in the figure), a first convolutional layer, a second convolutional layer, a third convolutional layer, a fourth convolutional layer, and a fifth convolutional layer connected in sequence. The first image partitioning layer is configured to traverse input template images by a moving window method to obtain a plurality of small template images. The first convolutional layer is configured to perform a convolution operation on each of the small template images to obtain a first feature map F1 of each of the small template images. The second convolutional layer is configured to perform convolution and downsampling pooling operations on the first feature map F1 to obtain a second feature map F2. The third convolutional layer is configured to perform convolution and downsampling pooling operations on the second feature map F2 to obtain a third feature map F3. The fourth convolutional layer is configured to perform convolution and downsampling pooling operations on the third feature map F3 to obtain a fourth feature map F4. The fifth convolutional layer is configured to perform convolution and downsampling pooling operations on the fourth feature map F4 to obtain a fifth feature map F5.

The second encoder includes a second image partitioning layer, a sixth convolutional layer, a seventh convolutional layer, an eighth convolutional layer, a ninth convolutional layer, and a tenth convolutional layer. The second image partitioning layer is configured to traverse input to-be-detected images by the moving window method to obtain a plurality of small to-be-detected images. The sixth convolutional layer is configured to perform a convolution operation on each of the small to-be-detected images to obtain a sixth feature map F1' of each of the small to-be-detected images. The seventh convolutional layer is configured to perform convolution and downsampling pooling operations on the sixth feature map F1' to obtain a seventh feature map F2'. The eighth convolutional layer is configured to perform convolution and downsampling pooling operations on the seventh feature map F2' to obtain an eighth feature map F3'. The ninth convolutional layer is configured to perform convolution and downsampling pooling operations on the eighth feature map F3' to obtain a ninth feature map F4'. The tenth convolutional layer is configured to perform convolution and downsampling pooling operations on the ninth feature map F4' to obtain a tenth feature map F5'.

The feature fusion module includes a concatenation layer and a spatial pyramid pooling layer connected in sequence. The concatenation layer is configured to concatenate the fifth feature map F5 and the tenth feature map F5' to obtain a concatenation feature. The spatial pyramid pooling layer is configured to perform a spatial pyramid pooling operation on the concatenation feature to obtain a fusion feature.

The decoder includes a first upsampling layer, a second upsampling layer, a third upsampling layer, a fourth upsampling layer, and a fifth upsampling layer connected in sequence. The first upsampling layer is connected to the spatial pyramid pooling layer. An input of the second upsampling layer is connected to outputs of the fourth convolutional layer and the ninth convolutional layer. An input of the third upsampling layer is connected to outputs of the third convolutional layer and the eighth convolutional layer. An input of the fourth upsampling layer is connected to outputs of the second convolutional layer and the seventh convolutional layer. An input of the fifth upsampling layer is connected to outputs of the first convolutional layer and the sixth convolutional layer.

The first upsampling layer is configured to perform an upsampling operation on the fusion feature to obtain a first decoding feature P1. The second upsampling layer is configured to concatenate the first decoding feature P1, the fourth feature map F4, and the ninth feature map F4' to obtain a second decoding feature P2. The third upsampling layer is configured to concatenate the second decoding feature P2, the third feature map F3, and the eighth feature map F3' to obtain a third decoding feature P3. The fourth upsampling layer is configured to concatenate the third decoding feature P3, the second feature map F2, and the seventh feature map F2' to obtain a fourth decoding feature P4. The fifth upsampling layer is configured to concatenate the fourth decoding feature P4, the first feature map F1, and the sixth feature map F1' to obtain a foreign object feature map P5.

3. The fusion network model is trained by taking the template images of different training scenarios in the training data as an input of the first encoder, taking the to-be-detected images of different training scenarios in the training data as an input of the second encoder, and taking minimizing a loss function as a target, and the trained fusion network model is determined as the foreign object intrusion prediction model.

In Step 103: In response to a determination that there is a different target between the to-be-detected image of the current scenario and the template image of the current scenario, a location of the different target is determined to obtain a target location, and whether there is a different target between the target location of each frame of image in the to-be-detected image set of the current scenario and the template image of the current scenario is determined by using a moving object filter model.

Specifically, it is determined whether there is the different target between the target location of each frame of image in the to-be-detected image set of the current scenario and the template image of the current scenario by using an Intersection over Union (IOU) matching method in the moving object filter model.

In Step 104: It is determined that there is a foreign object in the different target of the to-be-detected image of the current scenario in response to a determination that a number of frames of images with different targets in the $N^{th}$ frame of railway image to the $(N+m)^{th}$ frame of railway image of the current scenario is greater than a predetermined value, and an area where the location of the different target in the $N^{th}$ frame of railway image to the $(N+m)^{th}$ frame of railway image of the current scenario changes is set as a moving object, and then the moving object is filtered from the different target of the to-be-detected image of the current scenario to obtain a true foreign object in the to-be-detected image of the current scenario. For example, the set value may be 4.

A specific example in an actual application is provided below to further describe the method for detecting railway foreign object of the above embodiments in detail. An implementation process of the example is as follows: a key frame of image is acquired to construct a template image, and a real-time image is acquired as a to-be-detected image: images are enhanced: features of the template image and the to-be-detected image are extracted: object contours of the template image and the to-be-detected image are segmented: a foreign object intrusion prediction model is constructed, and differences between extracted object of the template image and that of the to-be-detected image are compared: a moving object is filtered; and a different object is predicted. Various steps are specifically introduced below.

In S1, the key frame of image is acquired to construct the template image, and the real-time image is acquired as the to-be-detected image: video stream data captured by a camera are acquired, a first key frame of image is extracted as the template image, and images are captured continuously in real time subsequently as to-be-detected images.

Specifically, the first key frame of image is acquired as the template image by pulling video stream from a network camera. The video stream can support a Real Time Streaming Protocol (RTSP) and a Real Time Messaging Protocol (RTMP), and support an H.264 encoding format and an H.265 encoding format.

A time interval for fixedly capturing key frames in the video stream is set, and frames of images in a real-time video stream are regularly captured as the to-be-detected images. Capture time of the to-be-detected images is later than that of the template image. A sequential order is distinguished by timestamps.

In S2, the images are enhanced: enhancement processing such as an image correction and noise processing are included, so that the images can truly reflect a shape of an object, and maintain consistency in coordinate locations.

The image correction processing: distortion of an image caused by an installation angle of a camera and self-imaging of a sensor will interfere with recognizing a target, so the image correction processing needs to be performed. Image element coordinate transformation between a distorted image and a reference image is achieved by using geometric correction, using a spatial location transformation relationship, and using a correction model according to a reason of distortion, and correction is performed by using a calculation formula and obtained auxiliary parameters.

The noise processing: the images are often affected by an imaging device, external environmental noise, and the like during digitization and transmission, leading to interference in imaging. Tilt errors of the images and projection errors caused by terrain undulations are eliminated. A data operation is directly performed on an original image by a spatial domain method, and a gray-scale value of a pixel is processed. Each weight obtained by calculating spatial proximity from each pixel to a central point is optimized to a product of a weight obtained by calculating the spatial proximity and a weight obtained by calculating pixel value similarity by bilateral filter. A convolution operation is performed on the optimized weight and the image to achieve effects of edge-preserving smoothing.

In S3: Foreign object feature maps of the template image and the to-be-detected image are extracted. First, the template image and the to-be-detected image are traversed by a moving window method to obtain a plurality of areas by taking the template image and the to-be-detected image processed in Step S2 as an input of the fusion network model. Still referring to FIG. 2, a 3*3 convolution operation is performed on each area to obtain initial feature maps F1 and F1'. Then, quartic convolution and downsampling pooling are performed on F1 and F1' on the basis of a feature extraction idea of Unet to finally obtain an output feature F5 of the template image and an output feature F5' of the to-be-detected image. All channels of the output feature F5 and F5' are concatenated and are subjected to spatial pyramid pooling to obtain P1 to expand a receptive field of a feature map. Finally, on the basis of a feature fusion idea of the Unet, P1 is subjected to upsampling and is subjected to feature channel concatenation with F4 and F4' to obtain P2, P2 is subjected to upsampling and is subjected to feature channel concatenation with F3 and F3' to obtain P3, . . . , and foreign object feature maps P5 of the template image and the to-be-detected image may be obtained by analogy.

An original image is traversed from left to right and from top to bottom in a size of 100×100 by using a moving window method to divide a complete image into a plurality of parts according to a setting method and rule. The setting method refers to a step size of a moving window and a size of a window. Here, the size of the window is set as 100×100, and the step size is set as 50×50.

It is to be noted that each convolution is accompanied by an activation function layer and Batch Normalization. A non-linear activation function can improve the non-linear learning capacity of a network. The Batch Normalization can accelerate the convergence speed during model training, so that a model training process is more stable, and gradient explosion or gradient disappearance are avoided.

In S4: The fusion network model is trained to construct a foreign object intrusion prediction model and prediction is performed. Training is performed by taking a comparative loss as a loss function of a network, specifically:

Similarity measurement $D_w$ between a template image $X_1$ of a training scenario and a to-be-detected image $X_2$ of the training scenario is considered, P represents a feature dimension, and Y represents label data indicating whether two samples (that is, $X_1$ and $X_2$) match or not (if Y=1, it indicates that the two samples are similar or match, that is, there is no different target between the template image and the to-be-detected image; and if Y=0, it indicates that the two samples are not similar or do not match, that is, there is a different target between the template image and the to-be-detected image). Assuming that M is a set threshold value, N is a number of samples, and W represents a network weight during training, then the comparative loss $L(W, (Y, X_1, X_2))$ may be defined as:

$$L(W, (Y, X_1, X_2)) = \frac{1}{N}\sum_{n=1}^{N} YD_W^2 + (1 - Y)\max(M - D_w, 0)^2.$$

Where, the similarity measurement $D_w$ is represented as follows by using a cosine similarity distance:

$$D_w = \frac{M_{x_1} \times M_{x_2}}{\|M_{x_1}\|\|M_{x_2}\|}$$

It is to be noted that $M_{x_1}$ in the equation represents a feature matrix of the template image $X_1$, and $M_{x_2}$ represents a feature matrix of a to-be-detected image $X_2$. A core idea is that feature matrices is subjected to cosine similarity measurement, and the similarity of two inputs is learned through the reduction of loss. Finally, a trained network weight and network structure are obtained as the foreign object intrusion prediction model.

In a predicting process, a foreign object segmentation image can be obtained by only inputting the to-be-detected image and the template image of the target scenario into the foreign object intrusion prediction model. If a foreign object result image shows that an object is in the to-be-detected image but is not in the template map, then the object is considered as a foreign object, and the foreign object is annotated. An annotation is not limited to the foreign object, but also include two types: trains and pedestrians. When the trains and the pedestrians appear, the system will filter the trains and the pedestrians by default. A segmentation result includes coordinate information, pixel information, and area information of all object contours. It is to be noted that an object is not distinguished according to the type of the object, but is distinguished according to the obtained object contour and an image area framed by the object contour in the to-be-detected image.

In S5: A moving object filter model: classification training is performed by using acquired moving targets to obtain a classification model, and moving object recognition is performed on the different target predicted in S4.

Six consecutive to-be-detected images with features extracted are compared on the basis of the to-be-detected images with foreign objects obtained in S4, and the foreign object of each to-be-detected image is tracked. If there are four or more frames of to-be-detected images including foreign object information, the moving target is recognized as a foreign object; and if there are three or less frames of to-be-detected images including the foreign object information, the moving target is not recognized as the foreign object.

After the moving target is recognized as the foreign object, comparison and tracking are performed on location information and pixel information of the target, and the target with a significant change in position is recognized as a moving object and is filtered.

A system will store detection results of last six frames in a result queue. When a foreign object is detected in a first frame, whether the foreign object appears at the same location will be detected in the five subsequent frames. If the foreign object appears in four frames within the six frames, it is considered that there is the foreign object, and otherwise, it is considered that there is a moving object, for example, a flying insect or a domesticated cow or sheep. A method for determining whether the foreign object appears at the same location is Intersection over Union (IOU) matching, and it is considered that the foreign object is the same object when an IOU value of a former frame and a later frame is greater than a preset threshold value.

In S6: Railway foreign object intrusion prediction: the moving object is filtered on the basis of a classification result obtained in step S5, so as to realize prediction of the foreign object.

Figure 3A:
FIG. 3A-FIG. 3C are pictures of railway foreign object intrusion prediction results according to the embodiments of the present disclosure.
Figure 3B:
Figure 3C:
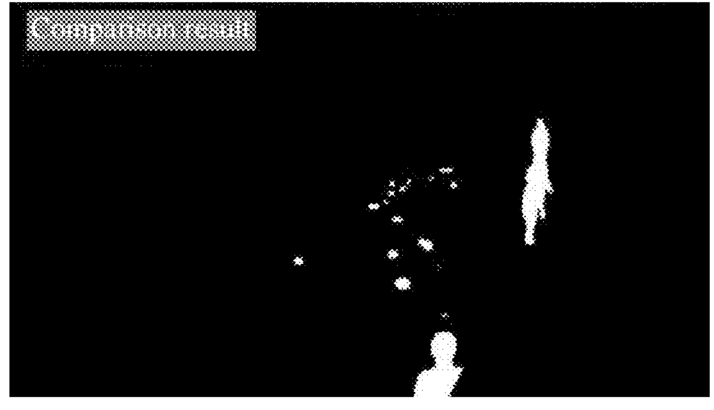

The railway foreign object intrusion prediction model obtained on the basis of the above steps realizes the prediction of foreign object intrusion of a detected railway section by acquiring a camera video stream in real time and capturing key frames in real time for comparison and analysis. FIG. 3A-FIG. 3C show a railway foreign object intrusion prediction result. FIG. 3A is a template image, FIG. 3B is a to-be-detected image, and FIG. 3C is a prediction result map.

According to the present embodiment, image enhancement processing such as image correction and noise processing is performed on an acquired real-time image of a railway section, image features of a template image and a real-time to-be-detected image are extracted by using a moving window technology, and a target is segmented according to the features, a foreign object intrusion prediction model is constructed according to the feature of the template image, the feature of the to-be-detected image is compared by using the model to obtain a different target, and a moving object is filtered, thereby realizing the prediction of railway foreign object intrusion.

The present embodiment has the following advantages:

(1) The present embodiment can realize the prediction of the railway foreign object intrusion without a capacity of collecting all foreign object types and training and recognizing the types in advance, that is, can recognize a new foreign object quickly and accurately, and has an effect of high iteration frequency.

(2) The present embodiment has low application cost, a large coverage range, and high reliability, and can provide a more specific, scientific, and efficient monitoring means for railway construction, operation, maintenance, disaster prevention and reduction, and the like, thereby improving the safety level of railway operation, and has great actual application value.

Embodiment 2

To perform the method corresponding to Embodiment 1 above to realize corresponding functions and technical effects, a system for detecting railway foreign object intrusion is provided below.

Figure 4:
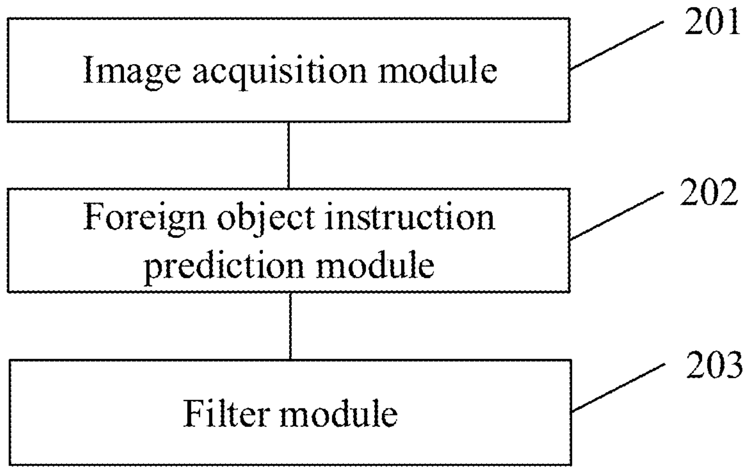
FIG. 4 is a structural diagram of a system for detecting railway foreign object intrusion according to the embodiments of the present disclosure.

Referring to FIG. 4, the system includes:

an image acquisition module 201, configured to acquire a template image, a to-be-detected image, and a to-be-detected image set of a current scenario, where the template image is a first key frame of railway image, the to-be-detected image is an $N^{th}$ frame of railway image, and the to-be-detected image set includes: railway images from $(N+1)^{th}$ frame to $(N+m)^{th}$ frame, where $N>1$, and $m>1$;

a foreign object intrusion prediction module 202, configured to input the template image of the current scenario and the to-be-detected image of the current scenario into a foreign object intrusion prediction model to obtain a foreign object feature map of the current scenario, where the foreign object feature map is used for determining whether there is a different target between the to-be-detected image and the template image, and the foreign object intrusion prediction model is constructed on the basis of a siamese network and a UNet segmentation network; and a filter module 203, configured to determine a location of the different target to obtain a target location in response to a determination that there is a different target between the to-be-detected image of the current scenario and the template image of the current scenario, determine, by using a moving object filter model, whether there is a different target between the target location of each frame of image in the to-be-detected image set of the current scenario and the template image of the current scenario; determine that there is a foreign object in the different target of the to-bedetected image of the current scenario in response to a determination that a number of frames of images with different targets in the $N^{th}$ frame of railway image to the $(N+m)^{th}$ frame of railway image of the current scenario is greater than a predetermined value: set an area where the location of the different target in the $N^{th}$ frame of railway image to the $(N+m)^{th}$ frame of railway image of the current scenario changes as a moving object, and filter the moving object from the different target of the to-be-detected image of the current scenario to obtain a true foreign object in the to-be-detected image of the current scenario.

Embodiment 3

The present embodiment provides an electronic device, including a memory and a processor. The memory is configured to store a computer program, and the processor runs the computer program to enable the electronic device to execute the method for detecting railway foreign object intrusion of Embodiment 1.

Optionally, the above electronic device may be a server.

In addition, embodiments of the present disclosure further provide a computer-readable storage medium that stores a computer program. The method for detecting railway foreign object of Embodiment 1 is implemented when the computer program is executed by a processor.

Various embodiments in the present specification are described in a progressive manner. Each embodiment focuses on differences from other embodiments, and the same and similar parts of various embodiments may refer to one another. The system disclosed by the embodiment is described relatively simply since it corresponds to the method disclosed by the embodiments, and relevant point may refer to the description of a method section.

In this specification, specific examples are used to describe the principle and implementation manners of the present disclosure. The description of the embodiments above is merely intended to help understand the method and core idea of the present disclosure. In addition, those skilled in the art may make modifications based on the idea of the present disclosure with respect to the specific implementation manners and the application scope. In conclusion, the contents of the present specification shall not be construed as a limitation to the present disclosure.

What is claimed is:

1. A method for detecting railway foreign object intrusion, comprising:

acquiring a template image, a to-be-detected image, and a to-be-detected image set of a current scenario, wherein the template image is a first key railway image frame, the to-be-detected image is an $N^{th}$ railway image frame, and the to-be-detected image set comprises an $(N+1)^{th}$ railway image frame to an $(N+m)^{th}$ railway image frame, wherein N>1, and m>1;

inputting the template image of the current scenario and the to-be-detected image of the current scenario into a foreign object intrusion prediction model to obtain a foreign object feature map of the current scenario, wherein the foreign object feature map is used for determining whether there is a different target between the to-be-detected image and the template image, and the foreign object intrusion prediction model is constructed based on a siamese network and a UNet segmentation network;

determining a location of the different target to obtain a target location, in response to a determination that there is a different target between the to-be-detected image of the current scenario and the template image of the current scenario; determining, by using a moving object filter model, whether there is a different target between a target location of each image frame in the to-be-detected image set of the current scenario and the template image of the current scenario; determining that there is a foreign object in the different target of the to-be-detected image of the current scenario, in response to a determination that a number of image frames with different targets in the $N^{th}$ railway image frame to the $(N+m)^{th}$ railway image frame in the current scenario is greater than a predetermined value; setting an area where the location of the different target in the $N^{th}$ railway image frame to the $(N+m)^{th}$ railway image frame of the current scenario changes as a moving object; and filtering the moving object from the different target of the to-be-detected image of the current scenario to obtain a true foreign object in the to-be-detected image of the current scenario.

2. The method according to claim 1, wherein the determining, by using a moving object filter model, whether there is a different target between a target location of each image frame in the to-be-detected image set of the current scenario and the template image of the current scenario comprises:

determining whether there is the different target between the target location of each image frame in the to-be-detected image set of the current scenario and the template image of the current scenario by using an Intersection over Union (IOU) matching method in the moving object filter model.

3. The method according to claim 1, wherein a method for determining the foreign object intrusion prediction model comprises:

acquiring training data, wherein the training data comprises: template images and to-be-detected images of different training scenarios, and corresponding label data, and the label data comprises whether there is a different target between a template image and a to-be-detected image of a training scenario;

constructing a fusion network model that fuses the siamese network and the UNet segmentation network, wherein the fusion network model comprises: a first encoder, a second encoder, a feature fusion module, and a decoder, the first encoder and the second encoder are of same structure and are both connected to the feature fusion module, and the feature fusion module is connected to the decoder; and training the fusion network model with the template images of different training scenarios in the training data as an input of the first encoder and the to-be-detected images of different training scenarios in the training data as an input of the second encoder, and with a goal of minimizing a loss function, and setting the trained fusion network model as the foreign object intrusion prediction model.

4. The method according to claim 3, wherein the first encoder comprises: a first image partitioning layer, a first convolutional layer, a second convolutional layer, a third convolutional layer, a fourth convolutional layer, and a fifth convolutional layer connected in sequence;

the first image partitioning layer is configured to traverse input template images by a moving window method to obtain a plurality of small template images; the first convolutional layer is configured to perform a convolution operation on each of the small template images to obtain a first feature map of each of the small template images; the second convolutional layer is configured to perform convolution and downsampling pooling operations on the first feature map to obtain a second feature map; the third convolutional layer is configured to perform convolution and downsampling pooling operations on the second feature map to obtain a third feature map; the fourth convolutional layer is configured to perform convolution and downsampling pooling operations on the third feature map to obtain a fourth feature map; the fifth convolutional layer is configured to perform convolution and downsampling pooling operations on the fourth feature map to obtain a fifth feature map;

the second encoder comprises: a second image partitioning layer, a sixth convolutional layer, a seventh convolutional layer, an eighth convolutional layer, a ninth convolutional layer, and a tenth convolutional layer;

the second image partitioning layer is configured to traverse input to-be-detected images by the moving window method to obtain a plurality of small to-be-detected images; the sixth convolutional layer is configured to perform a convolution operation on each of the small to-be-detected images to obtain a sixth feature map of each of the small to-be-detected images; the seventh convolutional layer is configured to perform convolution and downsampling pooling operations on the sixth feature map to obtain a seventh feature map; the eighth convolutional layer is configured to perform convolution and downsampling pooling operations on the seventh feature map to obtain an eighth feature map; the ninth convolutional layer is configured to perform convolution and downsampling pooling operations on the eighth feature map to obtain a ninth feature map; the tenth convolutional layer is configured to perform convolution and downsampling pooling operations on the ninth feature map to obtain a tenth feature map;

the feature fusion module comprises: a concatenation layer and a spatial pyramid pooling layer connected in sequence; the concatenation layer is configured to concatenate the fifth feature map and the tenth feature map to obtain a concatenation feature; the spatial pyramid pooling layer is configured to perform a spatial pyramid pooling operation on the concatenation feature to obtain a fusion feature;

the decoder comprises: a first upsampling layer, a second upsampling layer, a third upsampling layer, a fourth upsampling layer, and a fifth upsampling layer connected in sequence; the first upsampling layer is connected to the spatial pyramid pooling layer; an input of the second upsampling layer is connected to outputs of the fourth convolutional layer and the ninth convolutional layer; an input of the third upsampling layer is connected to outputs of the third convolutional layer and the eighth convolutional layer; an input of the fourth upsampling layer is connected to outputs of the second convolutional layer and the seventh convolutional layer; an input of the fifth upsampling layer is connected to outputs of the first convolutional layer and the sixth convolutional layer;

the first upsampling layer is configured to perform an upsampling operation on the fusion feature to obtain a first decoding feature; the second upsampling layer is configured to concatenate the first decoding feature, the fourth feature map, and the ninth feature map to obtain a second decoding feature; the third upsampling layer is configured to concatenate the second decoding feature, the third feature map, and the eighth feature map to obtain a third decoding feature; the fourth upsampling layer is configured to concatenate the third decoding feature, the second feature map, and the seventh feature map to obtain a fourth decoding feature; and the fifth upsampling layer is configured to concatenate the fourth decoding feature, the first feature map, and the sixth feature map to obtain a foreign object feature map.

5. The method according to claim 1, wherein the inputting the template image of the current scenario and the to-be-detected image of the current scenario into a foreign object intrusion prediction model to obtain a foreign object feature map of the current scenario comprises:

performing image enhancement processing on each of the template image of the current scenario and the to-be-detected image of the current scenario to obtain an enhanced template image of the current scenario and an enhanced to-be-detected image of the current scenario; and inputting the enhanced template image of the current scenario and the enhanced to-be-detected image of the current scenario into the foreign object intrusion prediction model to obtain the foreign object feature map of the current scenario.

6. The method according to claim 5, wherein the performing image enhancement processing on each of the template image of the current scenario and the to-be-detected image of the current scenario to obtain an enhanced template image of the current scenario and an enhanced to-be-detected image of the current scenario comprises:

performing image correction and image noise processing on the template image of the current scenario in sequence to obtain the enhanced template image of the current scenario; and performing the image correction and image noise processing on the to-be-detected image of the current scenario in sequence to obtain the enhanced to-be-detected image of the current scenario.

7. The method according to claim 1, wherein m=5, and the predetermined value is 4.

8. A system for detecting railway foreign object intrusion, comprising:

an image acquisition module, configured to acquire a template image, a to-be-detected image, and a to-be-detected image set of a current scenario, wherein the template image is a first key railway image frame, the to-be-detected image is an $N^{th}$ railway image frame, and the to-be-detected image set comprises an $(N+1)^{th}$ railway image frame to an $(N+m)^{th}$ railway image frame, wherein N>1, and m>1;

a foreign object intrusion prediction module, configured to input the template image of the current scenario and the to-be-detected image of the current scenario into a foreign object intrusion prediction model to obtain a foreign object feature map of the current scenario, wherein the foreign object feature map is used for determining whether there is a different target between the to-be-detected image and the template image, and the foreign object intrusion prediction model is constructed based on a siamese network and a UNet segmentation network; and a filter module, configured to determine a location of the different target to obtain a target location in response to a determination that there is a different target between the to-be-detected image of the current scenario and the template image of the current scenario; determining, by using a moving object filter model, whether there is a different target between a target location of each image frame in the to-be-detected image set of the current scenario and the template image of the current scenario; determine that there is a foreign object in the different target of the to-be-detected image of the current scenario in response to a determination that a number of image frames with different targets in the $N^{th}$ railway image frame to the $(N+m)^{th}$ railway image frame of the current scenario is greater than a predetermined value; set an area where the location of the different target in the $N^{th}$ railway image frame to the $(N+m)^{th}$ railway image frame of the current scenario changes as a moving object; and filter the moving object from the different target of the to-be-detected image of the current scenario to obtain a true foreign object in the to-be-detected image of the current scenario.

9. An electronic device, comprising a memory and a processor, wherein the memory is configured to store a computer program; and the processor runs the computer program to enable the electronic device to perform the method for detecting railway foreign object intrusion according to claim 1.

10. A non-transitory computer-readable storage medium, storing a computer program, wherein the computer program is executed by a processor to implement the method for detecting railway foreign object intrusion according to claim 1.

11. The electronic device according to claim 9, wherein the processor runs the computer program to enable the electronic device to perform steps of:

determining whether there is the different target between the target location of each image frame in the to-be-detected image set of the current scenario and the template image of the current scenario by using an Intersection over Union (IOU) matching method in the moving object filter model.

12. The electronic device according to claim 9, wherein the processor runs the computer program to enable the electronic device to perform steps of:

wherein a method for determining the foreign object intrusion prediction model comprises:

acquiring training data, wherein the training data comprises: template images and to-be-detected images of different training scenarios, and corresponding label data, and the label data comprises whether there is a different target between a template image and a to-be-detected image of a training scenario;

constructing a fusion network model that fuses the siamese network and the UNet segmentation network, wherein the fusion network model comprises: a first encoder, a second encoder, a feature fusion module, and a decoder, the first encoder and the second encoder are of same structure and are both connected to the feature fusion module, and the feature fusion module is connected to the decoder; and training the fusion network model with the template images of different training scenarios in the training data as an input of the first encoder and the to-be-detected images of different training scenarios in the training data as an input of the second encoder, and with a goal of minimizing a loss function, and setting the trained fusion network model as the foreign object intrusion prediction model.

13. The electronic device according to claim 12, wherein the processor runs the computer program to enable the electronic device to perform steps of:

wherein the first encoder comprises: a first image partitioning layer, a first convolutional layer, a second convolutional layer, a third convolutional layer, a fourth convolutional layer, and a fifth convolutional layer connected in sequence;

the first image partitioning layer is configured to traverse input template images by a moving window method to obtain a plurality of small template images; the first convolutional layer is configured to perform a convolution operation on each of the small template images to obtain a first feature map of each of the small template images; the second convolutional layer is configured to perform convolution and downsampling pooling operations on the first feature map to obtain a second feature map; the third convolutional layer is configured to perform convolution and downsampling pooling operations on the second feature map to obtain a third feature map; the fourth convolutional layer is configured to perform convolution and downsampling pooling operations on the third feature map to obtain a fourth feature map; the fifth convolutional layer is configured to perform convolution and downsampling pooling operations on the fourth feature map to obtain a fifth feature map;

the second encoder comprises: a second image partitioning layer, a sixth convolutional layer, a seventh convolutional layer, an eighth convolutional layer, a ninth convolutional layer, and a tenth convolutional layer;

the second image partitioning layer is configured to traverse input to-be-detected images by the moving window method to obtain a plurality of small to-be-detected images; the sixth convolutional layer is configured to perform a convolution operation on each of the small to-be-detected images to obtain a sixth feature map of each of the small to-be-detected images; the seventh convolutional layer is configured to perform convolution and downsampling pooling operations on the sixth feature map to obtain a seventh feature map; the eighth convolutional layer is configured to perform convolution and downsampling pooling operations on the seventh feature map to obtain an eighth feature map; the ninth convolutional layer is configured to perform convolution and downsampling pooling operations on the eighth feature map to obtain a ninth feature map; the tenth convolutional layer is configured to perform convolution and downsampling pooling operations on the ninth feature map to obtain a tenth feature map;

the feature fusion module comprises: a concatenation layer and a spatial pyramid pooling layer connected in sequence; the concatenation layer is configured to concatenate the fifth feature map and the tenth feature map to obtain a concatenation feature; the spatial pyramid pooling layer is configured to perform a spatial pyramid pooling operation on the concatenation feature to obtain a fusion feature;

the decoder comprises: a first upsampling layer, a second upsampling layer, a third upsampling layer, a fourth upsampling layer, and a fifth upsampling layer connected in sequence; the first upsampling layer is connected to the spatial pyramid pooling layer; an input of the second upsampling layer is connected to outputs of the fourth convolutional layer and the ninth convolutional layer; an input of the third upsampling layer is connected to outputs of the third convolutional layer and the eighth convolutional layer; an input of the fourth upsampling layer is connected to outputs of the second convolutional layer and the seventh convolutional layer; an input of the fifth upsampling layer is connected to outputs of the first convolutional layer and the sixth convolutional layer;

the first upsampling layer is configured to perform an upsampling operation on the fusion feature to obtain a first decoding feature; the second upsampling layer is configured to concatenate the first decoding feature, the fourth feature map, and the ninth feature map to obtain a second decoding feature; the third upsampling layer is configured to concatenate the second decoding feature, the third feature map, and the eighth feature map to obtain a third decoding feature; the fourth upsampling layer is configured to concatenate the third decoding feature, the second feature map, and the seventh feature map to obtain a fourth decoding feature; and the fifth upsampling layer is configured to concatenate the fourth decoding feature, the first feature map, and the sixth feature map to obtain a foreign object feature map.

14. The electronic device according to claim 9, wherein the processor runs the computer program to enable the electronic device to perform steps of:

performing image enhancement processing on each of the template image of the current scenario and the to-be-detected image of the current scenario to obtain an enhanced template image of the current scenario and an enhanced to-be-detected image of the current scenario; and inputting the enhanced template image of the current scenario and the enhanced to-be-detected image of the current scenario into the foreign object intrusion prediction model to obtain the foreign object feature map of the current scenario.

15. The electronic device according to claim 14, wherein the processor runs the computer program to enable the electronic device to perform steps of:

performing image correction and image noise processing on the template image of the current scenario in sequence to obtain the enhanced template image of the current scenario; and performing the image correction and image noise processing on the to-be-detected image of the current scenario in sequence to obtain the enhanced to-be-detected image of the current scenario.

16. The electronic device according to claim 9, wherein m=5, and the predetermined value is 4.

17. The non-transitory computer-readable storage medium according to claim 10, wherein the computer program is executed by a processor to implement steps of:

determining whether there is the different target between the target location of each image frame in the to-be-detected image set of the current scenario and the template image of the current scenario by using an Intersection over Union (IOU) matching method in the moving object filter model.

18. The non-transitory computer-readable storage medium according to claim 10, wherein a method for determining the foreign object intrusion prediction model comprises:

acquiring training data, wherein the training data comprises: template images and to-be-detected images of different training scenarios, and corresponding label data, and the label data comprises whether there is a different target between a template image and a to-be-detected image of a training scenario;

constructing a fusion network model that fuses the siamese network and the UNet segmentation network, wherein the fusion network model comprises: a first encoder, a second encoder, a feature fusion module, and a decoder, the first encoder and the second encoder are of same structure and are both connected to the feature fusion module, and the feature fusion module is connected to the decoder; and training the fusion network model with the template images of different training scenarios in the training data as an input of the first encoder and the to-be-detected images of different training scenarios in the training data as an input of the second encoder, and with a goal of minimizing a loss function, and setting the trained fusion network model as the foreign object intrusion prediction model.

19. The non-transitory computer-readable storage medium according to claim 18, wherein the first encoder comprises: a first image partitioning layer, a first convolutional layer, a second convolutional layer, a third convolutional layer, a fourth convolutional layer, and a fifth convolutional layer connected in sequence;

the first image partitioning layer is configured to traverse input template images by a moving window method to obtain a plurality of small template images; the first convolutional layer is configured to perform a convolution operation on each of the small template images to obtain a first feature map of each of the small template images; the second convolutional layer is configured to perform convolution and downsampling pooling operations on the first feature map to obtain a second feature map; the third convolutional layer is configured to perform convolution and downsampling pooling operations on the second feature map to obtain a third feature map; the fourth convolutional layer is configured to perform convolution and downsampling pooling operations on the third feature map to obtain a fourth feature map; the fifth convolutional layer is configured to perform convolution and downsampling pooling operations on the fourth feature map to obtain a fifth feature map;

the second encoder comprises: a second image partitioning layer, a sixth convolutional layer, a seventh convolutional layer, an eighth convolutional layer, a ninth convolutional layer, and a tenth convolutional layer;

the second image partitioning layer is configured to traverse input to-be-detected images by the moving window method to obtain a plurality of small to-be-detected images; the sixth convolutional layer is configured to perform a convolution operation on each of the small to-be-detected images to obtain a sixth feature map of each of the small to-be-detected images; the seventh convolutional layer is configured to perform convolution and downsampling pooling operations on the sixth feature map to obtain a seventh feature map; the eighth convolutional layer is configured to perform convolution and downsampling pooling operations on the seventh feature map to obtain an eighth feature map; the ninth convolutional layer is configured to perform convolution and downsampling pooling operations on the eighth feature map to obtain a ninth feature map; the tenth convolutional layer is configured to perform convolution and downsampling pooling operations on the ninth feature map to obtain a tenth feature map;

the feature fusion module comprises: a concatenation layer and a spatial pyramid pooling layer connected in sequence; the concatenation layer is configured to concatenate the fifth feature map and the tenth feature map to obtain a concatenation feature; the spatial pyramid pooling layer is configured to perform a spatial pyramid pooling operation on the concatenation feature to obtain a fusion feature;

the decoder comprises: a first upsampling layer, a second upsampling layer, a third upsampling layer, a fourth upsampling layer, and a fifth upsampling layer connected in sequence; the first upsampling layer is connected to the spatial pyramid pooling layer; an input of the second upsampling layer is connected to outputs of the fourth convolutional layer and the ninth convolutional layer; an input of the third upsampling layer is connected to outputs of the third convolutional layer and the eighth convolutional layer; an input of the fourth upsampling layer is connected to outputs of the second convolutional layer and the seventh convolutional layer; an input of the fifth upsampling layer is connected to outputs of the first convolutional layer and the sixth convolutional layer;

the first upsampling layer is configured to perform an upsampling operation on the fusion feature to obtain a first decoding feature; the second upsampling layer is configured to concatenate the first decoding feature, the fourth feature map, and the ninth feature map to obtain a second decoding feature; the third upsampling layer is configured to concatenate the second decoding feature, the third feature map, and the eighth feature map to obtain a third decoding feature; the fourth upsampling layer is configured to concatenate the third decoding feature, the second feature map, and the seventh feature map to obtain a fourth decoding feature; and the fifth upsampling layer is configured to concatenate the fourth decoding feature, the first feature map, and the sixth feature map to obtain a foreign object feature map.

20. The non-transitory computer-readable storage medium according to claim 10, wherein the computer program is executed by a processor to implement steps of:

performing image enhancement processing on each of the template image of the current scenario and the to-be-detected image of the current scenario to obtain an enhanced template image of the current scenario and an enhanced to-be-detected image of the current scenario; and inputting the enhanced template image of the current scenario and the enhanced to-be-detected image of the current scenario into the foreign object intrusion prediction model to obtain the foreign object feature map of the current scenario.

* * * * *